(12) United States Patent
Lee et al.

(10) Patent No.: US 9,421,940 B2
(45) Date of Patent: Aug. 23, 2016

(54) AIRBAG APPARATUS

(71) Applicant: HYUNDAI MOBIS Co., Ltd., Yongin-si, Gyeonggi-do (KR)

(72) Inventors: Hyo Bae Lee, Yongin-si (KR); Dong Jun Kim, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 14/658,330

(22) Filed: Mar. 16, 2015

(65) Prior Publication Data

US 2016/0046252 A1 Feb. 18, 2016

(30) Foreign Application Priority Data

Aug. 18, 2014 (KR) .................. 10-2014-0107227

(51) Int. Cl.
*B60R 21/231* (2011.01)
*B60R 21/2338* (2011.01)

(52) U.S. Cl.
CPC .......... *B60R 21/231* (2013.01); *B60R 21/2338* (2013.01); *B60R 2021/23388* (2013.01)

(58) Field of Classification Search
CPC B60R 21/231; B60R 21/2338; B60R 21/237; B60R 2021/23388
See application file for complete search history.

(56) References Cited

U.S. PATENT DOCUMENTS

| | | | |
|---|---|---|---|
| 7,396,045 B2* | 7/2008 | Aranzulla | B60R 21/233 280/743.2 |
| 7,914,038 B2* | 3/2011 | Koyama | B60R 21/205 280/730.1 |
| 8,414,019 B2* | 4/2013 | Naganawa | B60R 21/203 280/730.1 |
| 8,430,425 B2* | 4/2013 | Marable | B60R 21/233 280/732 |
| 2006/0082114 A1* | 4/2006 | Heym | B60R 21/233 280/743.1 |
| 2007/0182144 A1* | 8/2007 | Aranzulla | B60R 21/233 280/743.2 |
| 2009/0200778 A1* | 8/2009 | Ishikawa | B60R 21/2338 280/739 |
| 2009/0283998 A1 | 11/2009 | Kim | |
| 2009/0295136 A1* | 12/2009 | Kumagai | B60R 21/231 380/743.1 |
| 2009/0302582 A1* | 12/2009 | Koyama | B60R 21/205 280/728.2 |
| 2013/0099466 A1* | 4/2013 | Kim | B60R 21/2338 280/730.1 |

FOREIGN PATENT DOCUMENTS

| | | |
|---|---|---|
| JP | 2007-145098 A | 6/2007 |
| JP | 2013-082338 A | 5/2013 |
| KR | 10-2009-0120026 A | 11/2009 |
| KR | 10-2010-0068911 A | 6/2010 |

OTHER PUBLICATIONS

Jan. 5, 2016, Korean Office Action for related KR application No. 10-2014-0107227.
May 4, 2016, Korean Notice of Allowance for related KR application No. 10-2014-0107227.

* cited by examiner

*Primary Examiner* — Drew Brown
(74) *Attorney, Agent, or Firm* — Paratus Law Group, PLLC

(57) ABSTRACT

Provided is an airbag apparatus which prevents the neck of an occupant from being injured. To this end, the airbag apparatus according to the exemplary embodiment of the present invention includes: an airbag which is inflated when gas flows into the airbag, and deployed forward toward an occupant; and a slip panel which is coupled to a front surface of the airbag, and has a folded portion that is unfolded by expansive force of the airbag.

9 Claims, 6 Drawing Sheets

AIRBAG APPARATUS

CROSS-REFERENCE TO RELATED APPLICATIONS

The present application claims priority to Korean Patent Application Number 10-2014-0107227 filed Aug. 18, 2014, the entire contents of which the application is incorporated herein for all purposes by this reference.

TECHNICAL FIELD

The present invention relates to an airbag apparatus, and more particularly, to an airbag apparatus for a front passenger seat.

BACKGROUND

In general, an airbag for a front passenger seat is installed in an instrument panel that is disposed at an upper side of a glove box.

The airbag for a front passenger seat tears an upper skin of the instrument panel while being inflated by gas generated by a gas generator, protrudes upward from the instrument panel, and then is deployed forward toward an occupant.

When the airbag for a front passenger seat is deployed forward toward the occupant, the airbag is deployed while falling downward from an upper side of the instrument panel. Therefore, while the airbag for a front passenger seat is deployed, the airbag rebounds upward again by pressure of gas in the airbag.

When the head of the occupant comes into contact with the airbag for a front passenger seat at a point of time at which the airbag for a front passenger seat rebounds as described above, the head of the occupant is tilted backward due to rebounding airbag, and as a result, the neck of the occupant is injured.

SUMMARY

The present invention has been made in an effort to provide an airbag apparatus which prevents the neck of an occupant from being injured.

Technical problems of the present invention are not limited to the aforementioned technical problem, and other technical problems, which are not mentioned above, may be clearly understood by those skilled in the art from the following descriptions.

An exemplary embodiment of the present invention provides an airbag apparatus including: an airbag which is inflated when gas flows into the airbag, and deployed forward toward an occupant; and a slip panel which is coupled to a front surface of the airbag, and has a folded portion that is unfolded by expansive force of the airbag.

Other detailed matters of the exemplary embodiment are included in the detailed description and the drawings.

According to the airbag apparatus according to the present invention, the folded portions formed on the slip panel reduce force, which causes the airbag to rebound, while being unfolded by expansive force of the airbag, thereby preventing the neck of the occupant from being injured.

The effect of the present invention is not limited to the aforementioned effect, and other effects, which are not mentioned above, will be clearly understood by those skilled in the art from the claims.

DETAILED DESCRIPTION

Figure 1:
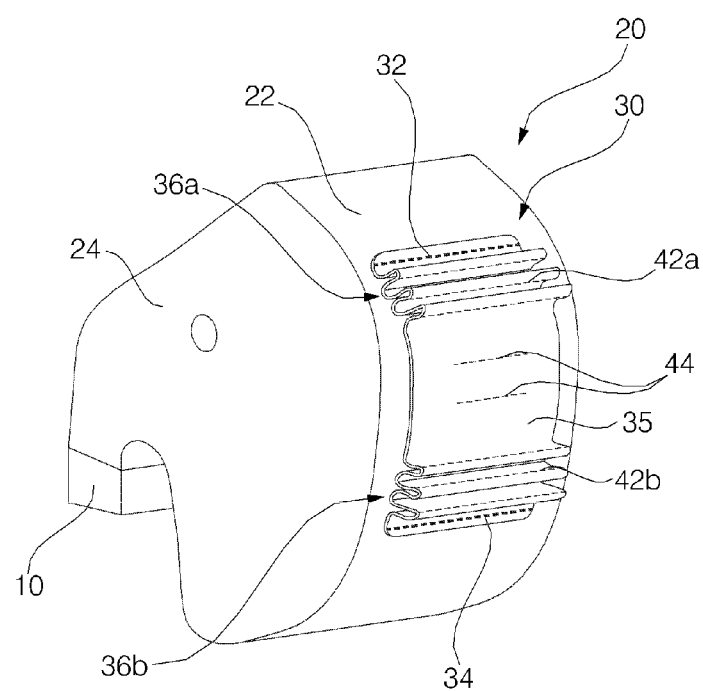
FIG. 1 is a perspective view illustrating an airbag apparatus according to a first exemplary embodiment of the present invention.

Various advantages and features of the present invention and methods for achieving the advantages and features will be clear with reference to exemplary embodiments described below in detail together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, an airbag apparatus according to exemplary embodiments of the present invention will be described with reference to the drawings.

Figure 2:
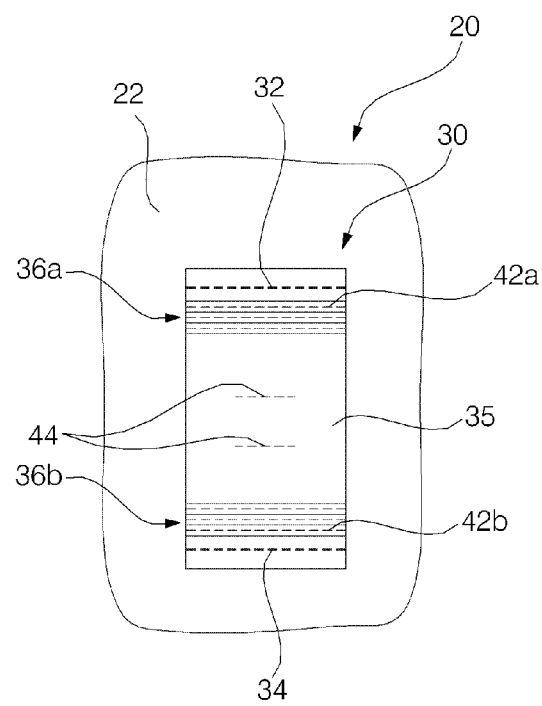
FIG. 2 is a front view illustrating the airbag apparatus according to the first exemplary embodiment of the present invention.

FIG. 1 is a perspective view illustrating an airbag apparatus according to a first exemplary embodiment of the present invention, and FIG. 2 is a front view illustrating the airbag apparatus according to the first exemplary embodiment of the present invention.

Referring to FIGS. 1 and 2, the airbag apparatus according to the first exemplary embodiment of the present invention includes an airbag 20, and a slip panel 30 coupled to a front surface of the airbag 20.

The airbag 20 is made of a flexible material, and inflated by pressure of gas when gas flows into the airbag 20. A gas generator 10, which generates gas, is coupled at the rear of the airbag 20.

The airbag 20 is formed by coupling three panels by sewing. That is, the airbag 20 includes a main panel 22 which is disposed at a center, and side panels 24 which are coupled to both sides of the main panel 22, respectively, with one on each side. The airbag 20 is completely manufactured by sewing the circumferences of the side panels 24 on the main panel 22.

The airbag apparatus according to the first exemplary embodiment of the present invention is an airbag apparatus for a front passenger seat which is installed in an instrument panel in order to protect an occupant seated in the front passenger seat. When gas generated by the gas generator 10 flows into the airbag 20, the airbag 20 tears an upper skin surface of the instrument panel and protrudes while being inflated, and then is deployed forward toward the occupant seated in the front passenger seat. In this case, when the airbag 20 is deployed forward toward the occupant, the airbag 20 is deployed while falling from the upper side to the lower side of the instrument panel. Here, the instrument panel means a panel which is disposed in front of the front passenger seat and in which a glove box is installed.

Because the airbag 20 is deployed while falling from the upper side to the lower side of the instrument panel when the airbag 20 is deployed forward toward the occupant as described above, the airbag 20 rebounds upward again by pressure of gas in the airbag 20 while being deployed toward the occupant. As described above, when the head of the occupant comes into contact with the airbag 20 at a point of time at which the airbag 20 rebounds, the head of the occupant is tilted backward due to the rebounding airbag 20, and as a result, the neck of the occupant is likely to be injured. However, according to the airbag apparatus according to the first exemplary embodiment of the present invention, the slip panel 30 prevents the airbag 20 from rebounding.

The slip panel 30 will be described in detail below.

In order to reduce force that causes the airbag 20 to rebound, the slip panel 30 is coupled to the front surface of the airbag 20. The slip panel 30 has folded portions 36a and 36b. The folded portions 36a and 36b are unfolded by expansive force of the airbag 20, thereby reducing force that causes the airbag 20 to rebound.

The slip panel 30 is made of a flexible material, and coupled to the airbag 20 by sewing. The slip panel 30 may be made of the same material as the airbag 20. The slip panel 30 is formed in a rectangular shape that is elongated upward and downward.

An upper end and a lower end of the slip panel 30 are coupled to the airbag 20 by sewing. As a thread 32 that is used to sew the upper end and the lower end of the slip panel 30 on the airbag 20, a thread 32, which has enough strength such that the thread 32 is not torn by expansive force of the airbag 20, is used. Therefore, even though the airbag 20 is inflated, the slip panel 30 is maintained in a state in which the upper end and the lower end of the slip panel 30 are coupled to the airbag 20.

A head contact portion 35 with which the head of the occupant comes into contact is formed at a center of the slip panel 30. The head contact portion 35 is also coupled to the airbag 20 by sewing. As a thread 44 that is used to sew the head contact portion 35 on the airbag 20, a thread 44, which has strength but can be torn by expansive force of the airbag 20, is used.

The folded portions 36a and 36b are formed by being folded several times. The folded portions 36a and 36b are folded several times and then coupled to the airbag 20 by sewing so as not to be unfolded. As threads 42a and 42b that are used to sew the folded portions 36a and 36b on the airbag 20, threads 42a and 42b, which have strength but can be torn by expansive force of the airbag 20, are used. Therefore, because the threads 42a and 42b are torn by expansive force of the airbag 20 when the airbag 20 is inflated, the folded portions 36a and 36b are unfolded.

One of the folded portions 36a and 36b is formed at an upper side of the head contact portion 35, and the other is formed at a lower side of the head contact portion 35. The folded portion 36a formed at the upper side of the head contact portion 35 is formed to be adjacent to the upper end of the slip panel 30. Further, the folded portion 36b formed at the lower side of the head contact portion 35 is formed to be adjacent to the lower end of the slip panel 30.

An operation of the airbag apparatus according to the first exemplary embodiment of the present invention, which is configured as described above, will be described below.

Figure 3:
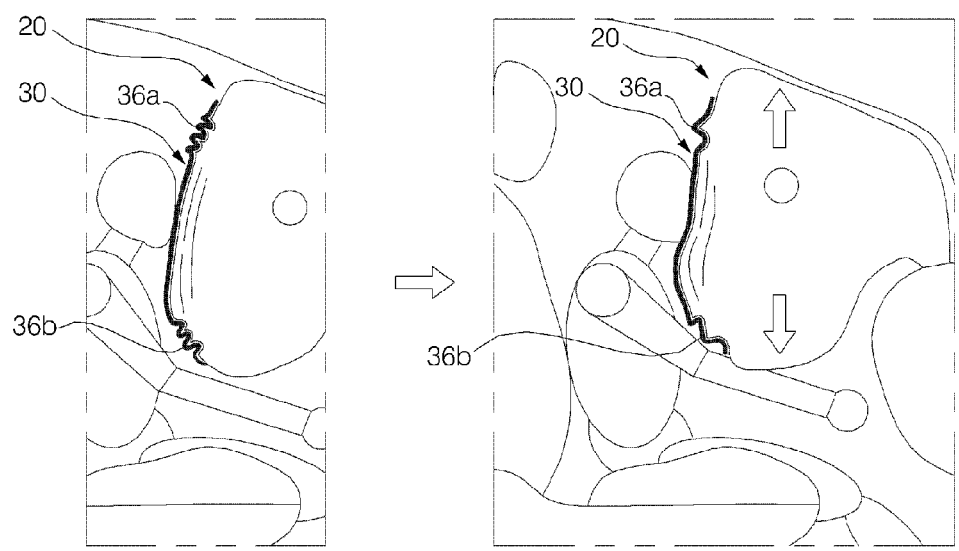
FIG. 3 is a view illustrating an operational sequence of the airbag apparatus according to the first exemplary embodiment of the present invention.

FIG. 3 is a view illustrating an operational sequence of the airbag apparatus according to the first exemplary embodiment of the present invention.

Referring to FIGS. 1 to 3, when the gas generator 10 generates gas, the airbag 20 is inflated by gas generated by the gas generator 10 and deployed forward toward the occupant. When the airbag 20 is deployed forward toward the occupant, the airbag 20 is deployed while falling from the upper side to the lower side of the instrument panel.

Thereafter, at a point of time at which the head of the occupant comes into contact with the head contact portion 35 formed in the slip panel 30, the thread 44, which couples the head contact portion 35 to the airbag 20, and the threads 42a and 42b, which couple the folded portions 36a and 36b to the airbag 20, are torn by expansive force of the airbag 20. Here, expansive force of the airbag 20 may mean force that causes airbag 20 to rebound. That is, the folded portions 36a and 36b may reduce force, which causes the airbag 20 to rebound, when a length of the airbag 20 in an up and down direction is increased while the airbag 20 is inflated by force that causes the airbag 20 to rebound. As described above, force, which causes the airbag 20 to rebound, is reduced, thereby preventing the neck of the occupant from being injured.

Figure 4:
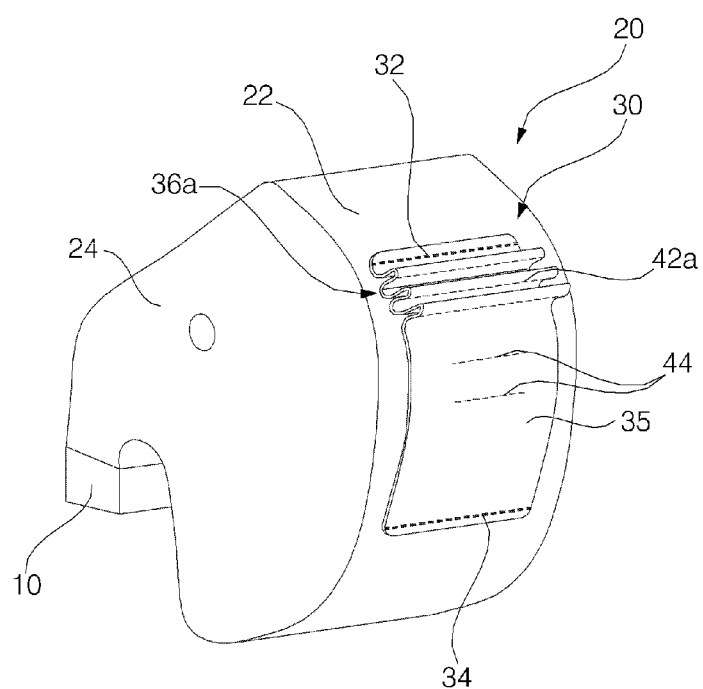
FIG. 4 is a perspective view illustrating an airbag apparatus according to a second exemplary embodiment of the present invention.

FIG. 4 is a perspective view illustrating an airbag apparatus according to a second exemplary embodiment of the present invention. Hereinafter, like reference numerals refer to constituent elements identical to those of the aforementioned first exemplary embodiment, a description thereof will be omitted, and only differences between the exemplary embodiments will be described.

Referring to FIG. 4, it can be seen that the airbag apparatus according to the second exemplary embodiment of the present invention differs from the airbag apparatus according to the aforementioned first exemplary embodiment. That is, in the aforementioned first exemplary embodiment, the folded portions 36a and 36b are formed at the upper and lower sides of the head contact portion 35, respectively, but in the second exemplary embodiment, the folded portion 36a is formed only at the upper side of the head contact portion 35. Even though the folded portion 36a is formed only at the upper side of the head contact portion 35 as described above, the effect of the aforementioned first exemplary embodiment may be obtained.

Figure 5:
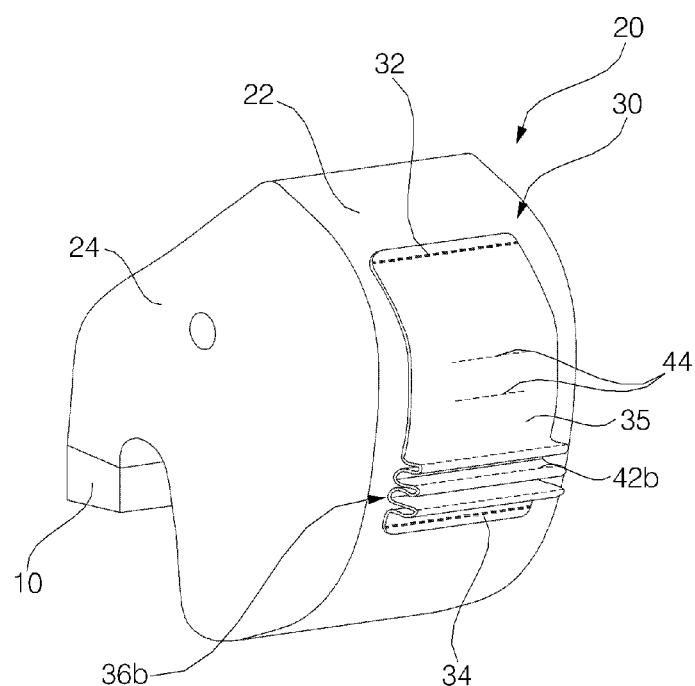
FIG. 5 is a perspective view illustrating an airbag apparatus according to a third exemplary embodiment of the present invention.

FIG. 5 is a perspective view illustrating an airbag apparatus according to a third exemplary embodiment of the present invention. Hereinafter, like reference numerals refer to constituent elements identical to those of the aforementioned first exemplary embodiment, a description thereof will be omitted, and only differences between the exemplary embodiments will be described.

Referring to FIG. 5, it can be seen that the airbag apparatus according to the third exemplary embodiment of the present invention differs from the airbag apparatus according to the aforementioned first exemplary embodiment. That is, in the aforementioned first exemplary embodiment, the folded portions 36a and 36b are formed at the upper and lower sides of the head contact portion 35, respectively, but in the third exemplary embodiment, the folded portion 36b is formed only at the lower side of the head contact portion 35. Even though the folded portion 36b is formed only at the lower side of the head contact portion 35 as described above, the effect of the aforementioned first exemplary embodiment may be obtained.

Figure 6:
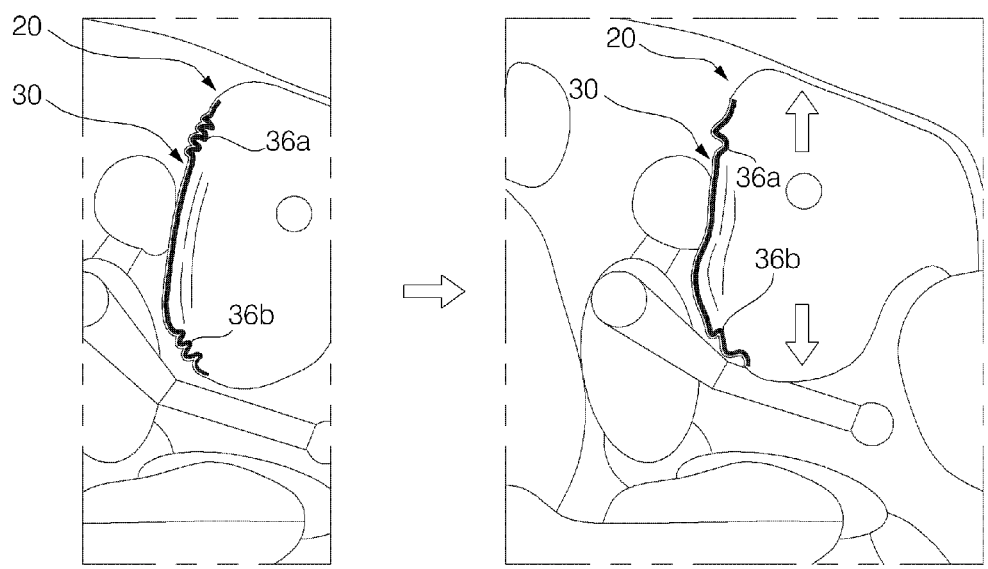
FIG. 6 is a view illustrating an operational sequence of an airbag apparatus according to a fourth exemplary embodiment of the present invention.

FIG. 6 is a view illustrating an operational sequence of an airbag apparatus according to a fourth exemplary embodiment of the present invention. Hereinafter, like reference numerals refer to constituent elements identical to those of the aforementioned first exemplary embodiment, a description thereof will be omitted, and only differences between the exemplary embodiments will be described.

Referring to FIG. 6, it can be seen that the airbag apparatus according to the fourth exemplary embodiment of the present invention differs from the airbag apparatus according to the aforementioned first exemplary embodiment. That is, in the aforementioned first exemplary embodiment, the slip panel 30 is disposed on an outer surface of the front surface of the airbag 20, but in the fourth exemplary embodiment, the slip panel 30 is disposed on an inner surface of the front surface of the airbag 20. Even though the slip panel 30 is disposed on the inner surface of the front surface of the airbag 20, the effect of the aforementioned first exemplary embodiment may be obtained.

According to the airbag apparatus according to the present invention as described above, the folded portions 36a and 36b formed on the slip panel 30 reduce force, which causes the airbag 20 to rebound, while being unfolded by expansive force of the airbag 20, thereby preventing the neck of the occupant from being injured.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning of the scope of the claims, the scope of the claims, and the equivalents thereto, are included in the scope of the present invention.

What is claimed is:

1. An airbag apparatus comprising:
   an airbag which is inflated when gas flows into the airbag, and deployed forward toward an occupant, the airbag including a folded part formed at a front surface of the airbag; and
   a slip panel which is coupled to the front surface of the airbag, and has a folded portion that is folded together with the folded part of the airbag;
   a first thread which sews the folded part and the folded portion together, and configured to be torn by an expansive force of the airbag such that the folded part and the folded portion are unfolded by the expansive force of the airbag.

2. The airbag apparatus of claim 1, wherein a length of the slip panel in an up and down direction is increased when the folded portion is unfolded.

3. The airbag apparatus of claim 1, wherein a head contact portion with which the head of the occupant comes into contact is further formed on the slip panel, and the folded portion is formed at upper and lower sides of the head contact portion, respectively.

4. The airbag apparatus of claim 1, wherein a head contact portion with which the head of the occupant comes into contact is further formed on the slip panel, and the folded portion is formed at an upper side of the head contact portion.

5. The airbag apparatus of claim 1, wherein a head contact portion with which the head of the occupant comes into contact is further formed on the slip panel, and the folded portion is formed at a lower side of the head contact portion.

6. The airbag apparatus of claim 1, wherein a head contact portion with which the head of the occupant comes into contact is further formed on the slip panel, and the head contact portion is coupled to the airbag by a second thread which has strength such that the thread is torn by expansive force of the airbag.

7. The airbag apparatus of claim 1, wherein the slip panel is disposed on an outer surface of the airbag.

8. The airbag apparatus of claim 1, wherein the slip panel is disposed on an inner surface of the airbag.

9. The airbag apparatus of claim 1, wherein upper and lower ends of the slip panel are coupled to the airbag by a third thread that has strength such that the thread is not torn by expansive force of the airbag.

* * * * *